A. THOMAS.
Grain-Separator.

No. 206,506.      Patented July 30, 1878.

WITNESSES:
Chas. Nida
C. Sedgwick

INVENTOR:
A. Thomas
BY
Munn & Co
ATTORNEYS.

UNITED STATES PATENT OFFICE.

ALEXANDER THOMAS, OF LEDYARD, NEW YORK.

IMPROVEMENT IN GRAIN-SEPARATORS.

Specification forming part of Letters Patent No. 206,566, dated July 30, 1878; application filed May 11, 1878.

*To all whom it may concern:*

Be it known that I, ALEXANDER THOMAS, of Ledyard, in the county of Cayuga and State of New York, have invented a new and Improved Clover and Grain Bolt, of which the following is a specification:

The object of my invention is to provide a simple and effective machine for separating any kind of foul seed from clover-seed or grain, or one kind of grain from another.

My invention consists in a sheet-metal cylinder revolving upon an inclined central axis, and perforated with longitudinal cup-slits in circumferential rows, arranged to break joints each with the next; and in the combination of the said cylinder with a cam-wheel secured upon the cylinder-shaft, to vibrate the cylinder by contact with a stationary pin or its equivalent; and in the combination, with a revolving perforated cylinder, of the stationary brush, arranged in contact with the surface of said cylinder, to clear out all seeds that may lodge in the said perforations, as will be hereinafter described.

Figure 1:
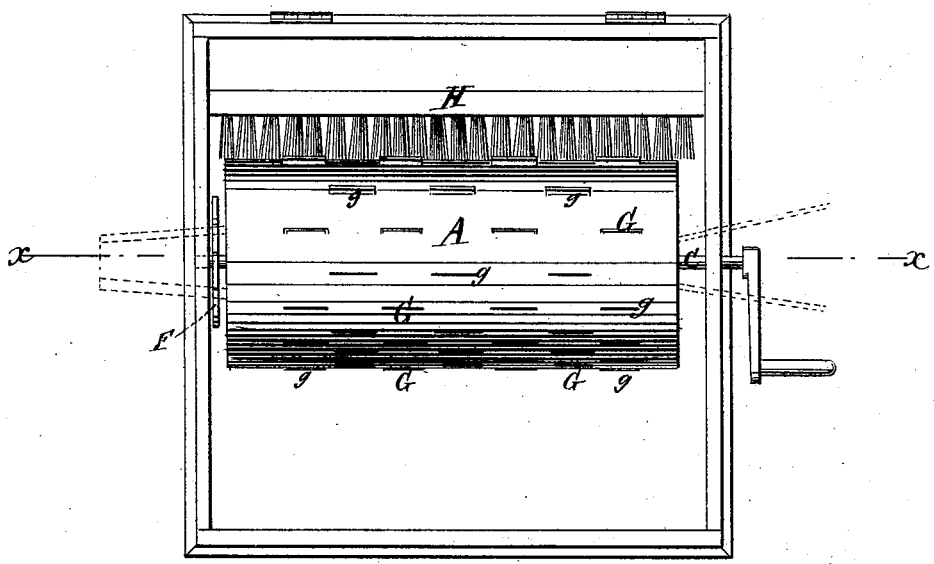
Figure 2:
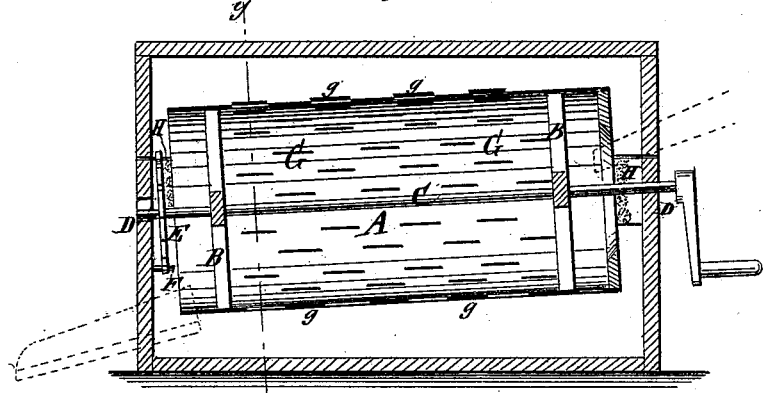
Figure 3:
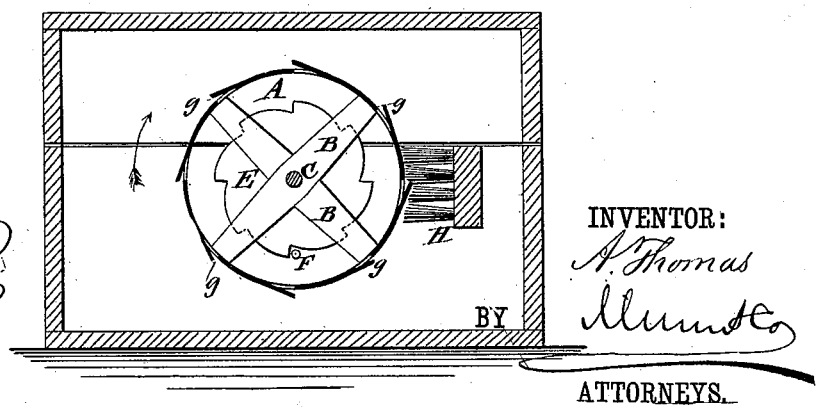

In the accompanying drawing, Figure 1 represents a top or plan view of my improved clover and grain bolt. Fig. 2 is a longitudinal vertical section of the same, taken on the line $x$ $x$ of Fig. 1. Fig. 3 is a cross-section of the same, taken on the line $y$ $y$ of Fig. 2.

Similar letters of reference indicate corresponding parts.

A is the bolt or cylinder, made of sheet metal, and open at both ends, being secured by diametrical cross-bars or radial arms B upon a shaft, C, going through the said bars in the center line of the cylinder.

The journals of the shaft C are fitted to revolve in bearings D at different elevations, so as to give an inclination to the bolt A from end to end.

E is a wheel, provided with a number of cam-shaped teeth, $e$, upon its face, and secured on the shaft C at its lower bearing in such a manner that, as the shaft is revolved, the series of cams $e$ will pass successively over and in contact with a stationary pin, shoulder, or equivalent, F, and thus cause the lower end of the cylinder A to be raised and dropped at the passing of each tooth or cam $e$ over the pin F a distance equal to the height or depth of the said tooth, thereby shaking or vibrating the cylinder while in motion.

The cylinder A is provided throughout its length with circumferential rows G of longitudinal slits $g$, the rows G being so arranged that the slits in one row break joints with those in the next; and the plate or tongue thus formed on one side of the slit is bent out a little, so as to form a small cavity or cup, with an opening at its bottom.

It will be observed that the plate is not slotted, but merely slitted, and the edge bent out, so that when the seed is fed into the elevated end of the cylinder A, and the latter revolved, the fine seed will be caught in the cup-slits $z$ and raised a little on the side which has an upward motion.

The fine seed passes through the slits into the receptacle below, and the coarse seed keeps rolling toward the lowest part of the bottom of the cylinder until it finally drops out through the lower end of the cylinder into a suitable receiver, and is thus separated from the fine seed.

By varying the sizes of the openings $z$ in the cylinder A the latter may be suited to bolt different kinds of grain, as may be desired.

H is a long and narrow brush, extending the length of and fixed stationary in contact with the revolving cylinder or bolt A, for the purpose of assisting the vibratory motion by the cam-wheel E in cleaning the slits from any seed or other obstruction that may remain in them.

The machine may be operated by a crank, as shown in the drawing, or connected by pulley and belt or other devices, to be run from a thrashing-machine or other power.

Having thus described my invention, I claim as new and desire to secure by Letters Patent—

1. The sheet-metal cylinder A, revolving upon the inclined axis of the central shaft C, and perforated with longitudinal cup-slits $g$ in circumferential rows G, arranged to break joints each with the other, and having the plates or tongues bent outward, forming a cup, substantially as and for the purpose set forth.

2. The combination of the cylinder A, constructed as described, with the cam-wheel E, secured upon the cylinder-shaft C, to vibrate the cylinder A by contact with the stationary pin F or its equivalent, substantially as shown and described.

ALEXANDER THOMAS.

Witnesses:
   THOS. P. PECKHAM,
   HENRY C. SMITH.